(12) United States Patent
Grohmann

(10) Patent No.: US 12,009,684 B2
(45) Date of Patent: Jun. 11, 2024

(54) ELECTRONIC VOLTAGE SUPPLY SYSTEM

(71) Applicant: MERCEDES-BENZ GROUP AG, Stuttgart (DE)

(72) Inventor: Dieter Grohmann, Gechingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 89 days.

(21) Appl. No.: 17/771,117

(22) PCT Filed: Sep. 14, 2020

(86) PCT No.: PCT/EP2020/075603
§ 371 (c)(1),
(2) Date: Apr. 22, 2022

(87) PCT Pub. No.: WO2021/078441
PCT Pub. Date: Apr. 29, 2021

(65) Prior Publication Data
US 2022/0376536 A1    Nov. 24, 2022

(30) Foreign Application Priority Data

Oct. 24, 2019   (DE) .................. 10 2019 007 420.3
Nov. 15, 2019   (DE) .................. 10 2019 007 956.6

(51) Int. Cl.
*H02J 7/00*          (2006.01)
*B60L 50/51*         (2019.01)

(52) U.S. Cl.
CPC ............ *H02J 7/0063* (2013.01); *B60L 50/51* (2019.02); *H02J 7/0024* (2013.01); *B60L 2210/10* (2013.01); *B60L 2210/40* (2013.01)

(58) Field of Classification Search
CPC ....... H02J 7/0063; H02J 7/0024; B60L 50/51; B60L 2210/10; B60L 2210/40
See application file for complete search history.

(56) References Cited

U.S. PATENT DOCUMENTS

2008/0006491 A1   1/2008  Degoul et al.
2012/0049771 A1*  3/2012  Komatsu ............... B60W 10/28
                                                318/139

(Continued)

FOREIGN PATENT DOCUMENTS

DE    102012003309 A1   8/2013
DE    102013225020 A1   6/2015

(Continued)

OTHER PUBLICATIONS

Office Action created Aug. 1, 2022 in related/corresponding DE Application No. 10 2019 007 956.6.

(Continued)

*Primary Examiner* — Daniel Cavallari
(74) *Attorney, Agent, or Firm* — PATENT PORTFOLIO BUILDERS PLLC

(57) ABSTRACT

An electronic voltage supply system includes a first battery string providing an electrical medium voltage at a first battery output and a second battery string providing the medium voltage at a second battery output. A potential distributor has a plurality of electrical low-voltage connections, each of which is connectable to the first and/or battery strings via a voltage transformer unit. The voltage transformer unit reduces the medium voltage provided by the first or second battery string to a low voltage. The system also includes first and second medium-voltage paths, which can be or is electrically connected to the first and/or second battery string and a first or second medium-voltage connection at which the medium voltage generated by the first or second battery string is provided. The system further includes a bridge circuit that connects the first medium voltage connection and the at least one second medium-voltage terminal to the first and/or second battery string.

6 Claims, 2 Drawing Sheets

(56) References Cited

U.S. PATENT DOCUMENTS

Figure 1:
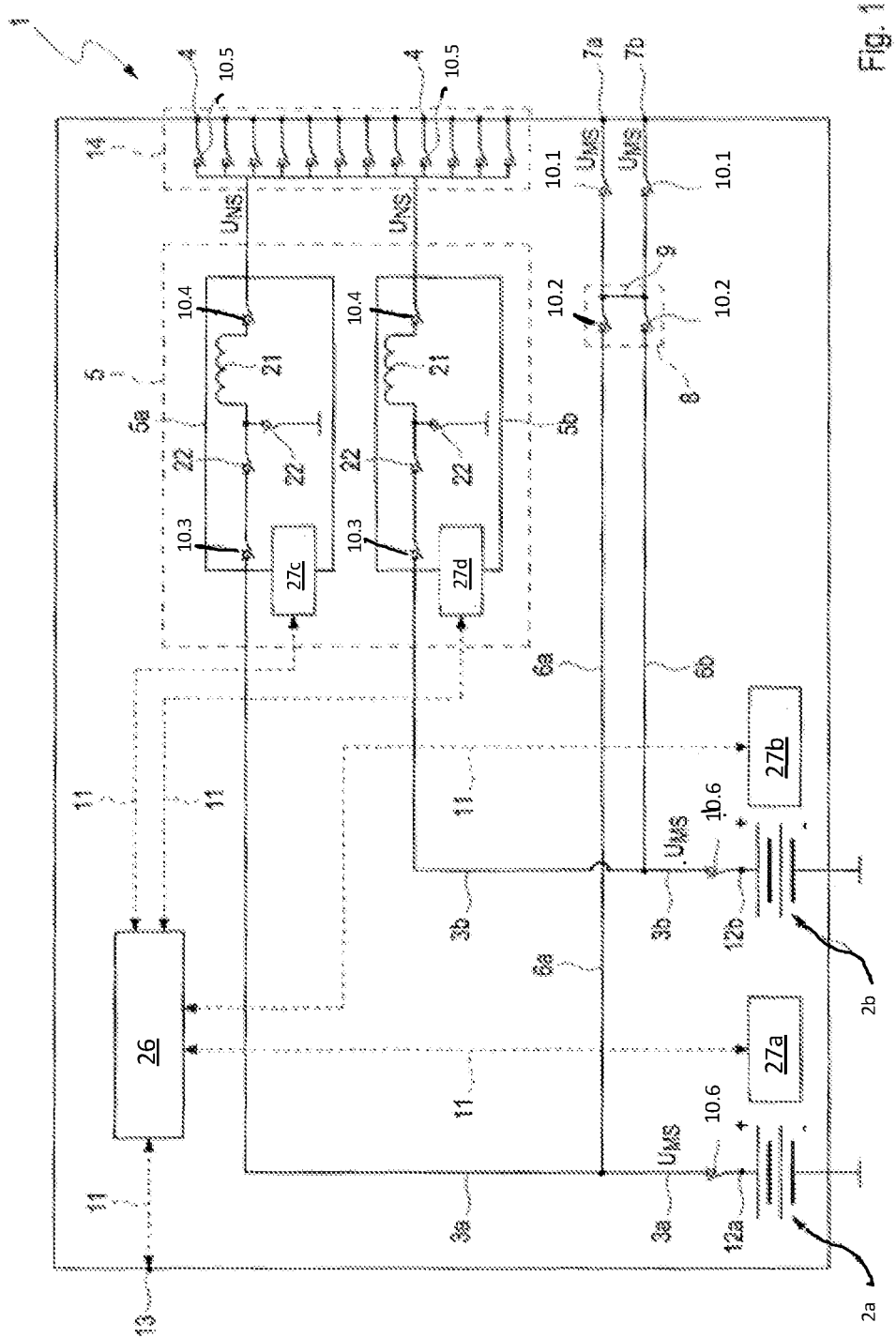

| | | |
|---|---|---|
| 2017/0036622 A1 | 2/2017 | Horn et al. |
| 2017/0288286 A1 | 10/2017 | Buckhout et al. |
| 2018/0334118 A1 | 11/2018 | Masui et al. |
| 2018/0354436 A1 | 12/2018 | Sato |
| 2019/0052119 A1 | 2/2019 | Hendrix et al. |
| 2019/0326772 A1* | 10/2019 | Shields .................. B60L 50/10 |
| 2021/0376627 A1* | 12/2021 | Sato ..................... G01R 31/382 |

FOREIGN PATENT DOCUMENTS

| | | |
|---|---|---|
| DE | 102014207993 A1 | 10/2015 |
| DE | 102015219590 B4 | 9/2017 |
| DE | 102017208030 A1 | 11/2018 |
| DE | 102017114339 A1 | 1/2019 |

OTHER PUBLICATIONS

International Search Report mailed Nov. 19, 2020 in related/corresponding International Application No. PCT/EP2020/075603.
Office Action created May 7, 2020 in related/corresponding DE Application No. 10 2019 007 956.6.
Written Opinion mailed Nov. 19, 2020 in related/corresponding International Application No. PCT/EP2020/075603.

\* cited by examiner

ELECTRONIC VOLTAGE SUPPLY SYSTEM

BACKGROUND AND SUMMARY OF THE INVENTION

Exemplary embodiments of the invention relate to an electronic voltage supply system for providing electrical energy to a battery module, and a battery module having such a voltage supply system.

In modern motor vehicles, battery modules with battery strings of individual batteries are used to provide electrical energy for different types of electrical consumers. Typically, the electrical energy is provided to the existing electrical consumers at different electrical voltage levels. In particular, the use of a so-called electrical low voltage of typically 12V for certain types of electrical consumers and the use of a so-called medium voltage—increased compared to the low voltage—of, for example, 48V for other types of electrical consumers is common.

DE 10 2017 208 030 A1 discloses an electronic voltage supply system in which a safety consumer is protected against a failure of one of two batteries or against the failure of one of two voltage converters.

DE 10 2013 225 020 A1 and DE 10 2014 207 993 A1 each disclose an electronic voltage supply system in which two partial on-board electrical systems, each with its own voltage converter, are provided, wherein a redundant supply via two voltage converters is implemented for individual safety-relevant consumers.

DE 10 2015 219 590 B4 is directed to an electronic voltage supply system with partial on-board electrical systems divided without overlapping.

US 2008/0 006 491 A1 shows a voltage supply system having a potential distributor to which two batteries of the same voltage level are connected.

Another voltage supply system is known from US 2019/0 052 119 A1, in which a single converter is present which supplies a partial on-board electrical system with voltage.

It is known from the prior art not to provide individual battery strings for the generation of the desired different voltage levels, but instead to generate the medium voltage explained above by means of a battery string from batteries connected in series and to convert it into a low voltage with the aid of a voltage converter, such that both voltage levels are provided.

The problem is that the occurrence of a malfunction in the battery string can lead to neither the medium voltage nor the low voltage being provided properly. In extreme cases, this would lead to a total failure of all electrical consumers. In the event of the voltage converter malfunctioning, this applies at least to the electrical low voltage generated by the voltage converter. In extreme cases, this can lead to the failure of all electrical consumers that require the electrical low voltage for operation.

Accordingly, exemplary embodiments of the present invention are directed to an electrical voltage supply system which addresses the problem explained above. In particular, an electronic voltage supply system is to be created in which it is ensured, even in the event of a malfunction that both the electrical medium voltage and the electrical low voltage are generated and made available to the consumers.

Accordingly, the basic idea of the invention is to electrically wire an electronic voltage supply system and to design it redundantly in such a way that, in the event of a failure of a battery string or an electrical voltage converter, an additionally available battery string or an additionally available voltage transformer can take over the function of the faulty component. For this purpose, the voltage supply system is equipped according to the invention with two battery strings and with two voltage converters, which can be connected to each other via a bridge circuit. In this way, the operational safety of the voltage supply system is increased. In particular, it is prevented that electrical consumers connected to the voltage supply system can no longer be supplied with the electrical supply voltage, in particular the electrical medium voltage or low voltage mentioned at the beginning, and thus also fail.

An electronic voltage supply system according to the invention for providing electrical voltage to a battery module comprises a first battery string providing an electrical medium voltage at a first battery output and a second battery spring providing the same medium voltage at a second battery output. The voltage supply system further comprises a potential distributor having a plurality of low-voltage electrical connections, each of which can be connected to the battery strings via a voltage converter unit. The voltage converter unit is designed in such a way that it reduces the medium voltage provided by the battery strings to a low voltage. In this way, several electrical consumers can be supplied with the electrical low voltage via the low voltage connections. Furthermore, the voltage supply system according to the invention comprises a first and at least a second medium voltage connection, at which the medium voltage generated by the first and second battery strings, respectively, is provided. In this way, the electrical consumers connected to one of the medium voltage connections can be supplied with the medium voltage. Furthermore, the voltage supply system comprises a bridge circuit by means of which the low-voltage connections, the first medium-voltage connection and the at least one second medium-voltage connection can each be optionally connected to the first or second battery string. In this way, both medium-voltage connections and the low-voltage connections can be connected to the respective other battery string if one battery string fails.

According to a preferred embodiment, the voltage converter unit comprises a first voltage converter, by means of which the low-voltage connections can be connected to the first and/or second battery string. In this embodiment, the voltage converter unit also comprises a second voltage converter by means of which the low-voltage connections can be connected to the first and/or second battery string. Thus, in case of failure of one of the two voltage converters, the required low voltage can be generated by means of the respective other voltage converter and provided at the low voltage connections.

Particularly preferably, the voltage supply system is designed in such a way that, in the event of simultaneous failure of one of the two battery strings and one of the two voltage converters, the medium voltage generated by the remaining battery string can be reduced to the low voltage by means of the bridge circuit by means of the remaining voltage converter and provided at the low-voltage connections. By means of such a design, a particularly high level of operational safety is achieved. In particular, it is ensured that safety-critical consumers are supplied with the required low voltage via the low-voltage connections in the event of a failure of a voltage converter or a battery string—even in the event of a combined failure.

According to another preferred embodiment, the bridge circuit is designed to be switchable between different circuit states in such a way that, depending on the set circuit state, the first medium-voltage connection is connected to the first and/or second battery string, and the second medium-voltage connection is connected to the first and/or second battery string. In this way, each of the medium-voltage connections can be connected to the respective other battery string in the event of failure of one battery string. For this purpose, the bridge circuit can expediently have a bridging path that connects the first and the second medium-voltage path between the battery strings and the medium-voltage connections.

Particularly expediently, the voltage supply system comprises a plurality of electrical and/or electronic switches for the realization of different system states, each of which can be adjusted between an open state and a closed state. In this case, the respective switch electrically interrupts the line path in which the switch is arranged in a known manner in the open state, whereas this interruption is cancelled in the closed state. In this variant, the voltage supply system comprises a control/regulation device by means of which each of the switches can be switched or adjusted between the open state and the closed state.

According to an advantageous development, the voltage supply system has at least one nominal system state and a first and second battery string fault state and is thus adjustable or switchable at least between these states. In the first battery string fault state, only the second battery string operates in a fault-free manner, whereas there is a fault in the first battery string, such that it does not generate the electrical medium voltage in the desired manner and provide it at the first battery output. In the second battery string fault state, on the other hand, only the first battery string operates fault-free, whereas there is a fault in the second battery string, such that it does not generate the electrical medium voltage in the desired manner and provide it at the second battery output. In the nominal system state, both battery strings operate fault-free, which means that both battery strings generate the electrical medium voltage.

According to this development, in the nominal system state, the bridge circuit is set such that the first medium voltage connection is connected at least to the first battery string and the second medium voltage connection is connected at least to the second battery string. In the first battery string fault state, however, the bridge circuit is set such that the first and second medium voltage terminals are both connected to the second battery string only. In the second battery string fault state, the bridge circuit is set such that the first and second medium voltage connections are both connected to the first battery string only. In this way, the generation of the medium voltage and its provision at all medium voltage connections is ensured by the respective battery string that is operating properly, i.e., is not faulty.

According to a further advantageous development, in the first battery string fault state, the voltage converter unit is set such that the low-voltage connections are connected to the second battery string. In this development, in the second battery string fault state, the voltage converter unit is correspondingly set in such a way that the low-voltage connections are connected to the first battery string. Thus, the generation of the low voltage and its provision at all low-voltage connections is ensured by the respective battery string that is operating properly, i.e., is not faulty.

According to a further advantageous development, the voltage supply system can have a first and a second voltage converter fault state which—independent of fault conditions in the battery strings—refers to fault conditions in the voltage converter unit. Therefore, the voltage converter fault states may be combined with or considered independently of the battery string fault states.

In this development, the low-voltage connections of the potential distributor are connected to the first and/or second battery string via the second voltage converter in the first voltage converter fault state and via the first voltage converter in the second voltage converter fault state. In this way, the required reduction of the medium voltage to the low voltage is implemented and ensured by means of the properly operating, i.e., non-faulty voltage converter.

Advantageously, for the technical implementation of the battery string fault states, a first switch is arranged between the bridging path of the bridge circuit and the first and second medium voltage connection in the first and second medium voltage path respectively. Alternatively, or additionally, a second switch can be arranged between the bridging path of the bridge circuit in the first or second medium voltage path and the first and second battery string.

According to another preferred embodiment, a third switch is provided between the two voltage converters and the first or second battery string. Alternatively, or additionally, in this embodiment, a fourth switch is provided between each of the two voltage converters and the plurality of low-voltage connections. If there is a fault state in one of the two voltage converters, this voltage converter can be electrically isolated from the voltage supply system by switching the associated fourth switch to the open state. This prevents the faulty voltage converter from generating an undesired electrical short-circuit of the low-voltage connections with an electrical ground.

According to another preferred embodiment, a fifth switch is provided on at least one low-voltage connection, preferably on all low-voltage connections, of the potential distributor. These fifth switches assume the function of electrical fuses, by means of which the electrical consumer connected to the respective low-voltage connection can be disconnected from the voltage supply system in the event of a malfunction.

Particularly preferably, a (sixth) switch is arranged at the first battery output and at the second battery string respectively. These switches serve to electrically disconnect the first or second battery string from the voltage supply system in the event of a fault—i.e., when the voltage supply system is in the first or second battery string fault state.

The invention also relates to a battery module for a motor vehicle having an electronic voltage supply system according to the invention, as explained above. The advantages of the voltage supply system according to the invention are therefore also transferred to the battery module according to the invention. The battery module comprises at least one electrical consumer connected to one of the low-voltage connections for supplying this consumer with the low voltage and at least one second electrical consumer connected to the first or second medium-voltage connection for supplying this consumer with the medium voltage. Suitable first electrical consumers are, for example, a fan for cooling an internal combustion engine of the motor vehicle, a vehicle steering device for steering the motor vehicle and a lighting device for illuminating the interior of the motor vehicle. Suitable second electrical consumers, for example, include in particular a PTC heater for heating a vehicle interior of the motor vehicle, a refrigerant compressor of an air conditioning system present in the motor vehicle, and a starter generator for starting an internal combustion engine of the motor vehicle.

According to a preferred embodiment, at least one DC-DC or DC-AC converter is connected to the first and/or second medium-voltage connection, which raises the medium voltage to a DC or AC voltage of a higher value, preferably to a DC voltage between 600V and 700V. This enables the connection of an electric drive for electric vehicles with purely electric drive to the battery module.

Further important features and advantages of the invention emerge from the drawings and from the associated description of the figures with reference to the drawings.

It is understood that the features mentioned above and those to be explained below can be used not only in the combination specified in each case, but also in other combinations or on their own without departing from the scope of the present invention.

BRIEF DESCRIPTION OF THE DRAWING FIGURES

Preferred exemplary embodiments of the invention are depicted in the drawings and will be explained in more detail in the following description, wherein identical reference numerals refer to identical or similar or functionally identical components.

Figure 2:
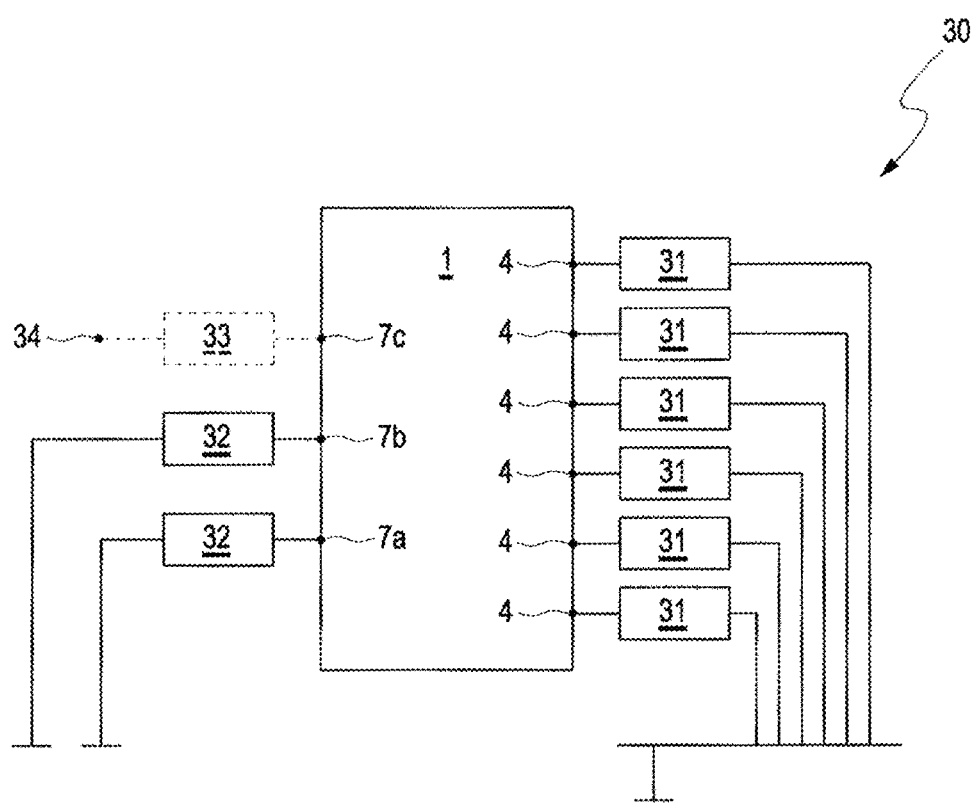

Here are shown, schematically in each case:

FIG. 1 an example of a voltage supply system according to the invention in a depiction in the manner of a circuit diagram, FIG. 2 an example of a battery module according to the invention having a voltage supply system according to the invention in a schematic, highly simplified depiction.

DETAILED DESCRIPTION

FIG. 1 illustrates, in a depiction in the manner of a circuit diagram, an example of an electronic voltage supply system 1 for providing electrical energy in a motor vehicle. The voltage supply system 1 comprises a first battery string 2a, which provides a medium voltage $U_{MS}$ at a first battery output 12a. The voltage supply system 1 further comprises a second battery string 2b, which provides the same electrical medium voltage $U_{MS}$ at a second battery output 12b as the first battery string 2a provides at the first battery output 12a. Typically, the first and second battery strings 2a, 2b each comprise the same number of rechargeable batteries 20 electrically connected in series. The voltage supply system 1 further comprises a so-called potential distributor 14 for distributing the low voltage $U_{NS}$ with a plurality of electrical low-voltage connections 4, each of which can be selectively connected to the first or second battery strings 2a, 2b via a voltage converter unit 5. For this purpose, a first electrical supply path 3a extends from the voltage converter unit 5 to the first battery terminal 12a and a second electrical supply path 3b extends to the second battery connection 12b. The voltage converter unit 5 is designed in such a way that it reduces the medium voltage $U_{MS}$ provided by the first or second battery string 2a, 2b to a low voltage $U_{NS}$, which is thus available at the low-voltage connections 4. Expediently, the medium voltage $U_MS$ is 48 volts and the low voltage $U_{NS}$ is 12 volts.

According to FIG. 1, the voltage converter unit 5 comprises a first voltage converter 5a, by means of which the low-voltage connections 4 can be connected to the first battery string 2a. Furthermore, the voltage converter unit 5 comprises a second voltage converter 5b, by means of which the low-voltage connections 4 can be connected to the second battery string 2b. Each of the two voltage converters 5a, 5b contains in a known manner a choke 21 and electronic switches 22 for voltage transformation of the medium voltage $U_{MS}$ to the low voltage $U_{NS}$.

Furthermore, the voltage supply system 1 comprises a first medium voltage path 6a and a second medium voltage path 6b electrically connected to the first battery string 2a and to the second battery string 2b, and has a first and a second medium voltage connection 7a, 7b, in which the medium voltage $U_{MS}$ generated by the first or second battery string 2a, 2b is provided. Furthermore, the voltage supply system 1 comprises a bridge circuit 8 via which both the first medium voltage connection 7a and the second medium voltage connection 7b can be connected to the first and second battery strings 2a, 2b independently of each other. The bridge circuit 8 is configured so as to be adjustable between different circuit states. Depending on the set circuit state, the first medium voltage connection 7a is connected to the first and/or second battery string 2a, 2b. Likewise, depending on the set circuit state, the second medium-voltage connection 7b is optionally connected to the first or second battery string 2a, 2b. The bridge circuit 8 also has a bridging path 9, which is arranged between the battery strings 2a, 2b and the medium-voltage connections 7a, 7b and connects the first medium-voltage path 6a to the second medium-voltage path 6b.

The voltage supply system 1 further comprises a control/regulation device 25. The control/regulation device 25 serves to control the two battery strings 2a, 2b as well as the two voltage converters 5a, 5b of the voltage converter unit 5.

In the example of FIG. 1, the control/regulation device 25 has a main control unit 26 by means of which four further auxiliary control units 27a, 27b, 27c, 27d can be controlled. All four auxiliary control units 27a to 27d are in communication with the main control unit 26. These communication links are indicated in FIG. 1 by arrows marked with the reference numeral 11. The four auxiliary control units 27a to 27d are used to control the battery strings 2a, 2b and the two voltage converters 5a, 5b. The first auxiliary control unit 27a controls the first battery string 2a. The second auxiliary control unit 27b controls the second battery string 2b. The third auxiliary control unit 27c controls the first voltage converter 5a. The fourth auxiliary control unit 27d controls the second voltage converter 5b. The main control unit 26 can be connected to a field bus—for example a LIN or CAN bus—of the motor vehicle via a communication interface 13.

The voltage supply system 1 further comprises several electrical or electronic switches 10, which are assigned to the aforementioned components of the voltage supply system 1 and can be controlled by the control/regulation device 25—in particular by the main control unit 26. In this way, different system states can be implemented in the voltage supply system 1. In particular, it is thus possible to react to different fault states that may occur in the voltage supply system 1.

Typically, each of the switches 10 is a transistor, preferably a field effect transistor (FET), most preferably a metal oxide field effect transistor (MOSFET). Each switch 10 can be switched or adjusted by the control device 25 at least between an open state and a closed state. In the open state, the respective switch 10 interrupts the line path in which the switch 10 is arranged and cancels this interruption in the closed state. The switch 10 thus fulfils an electrical disconnecting or interrupting function in a known manner.

The voltage supply system 1 can be switched or adjusted between different states with the aid of the switch 10, which will be explained in more detail below. First, the various switches 10 installed in the voltage supply system 1 will be discussed:

Between the bridging path 9 of the bridge circuit 8 and the first and second medium-voltage terminals 7a, 7b, a first switch 10.1 is provided in each of the first and second medium-voltage paths 6a, 6b respectively, which can be actuated by the control/regulation device 25. The first switches 10.1 assume the function of conventional fuses.

A second switch 10.2 is provided in the first or second medium-voltage paths 6a, 6b between the bridging path 9 of the bridge circuit 8 and the first and second battery strings 2a, 2b. In the event of a fault, these enable the medium-voltage connections 7a, 7b or the electrical consumers connected to the medium-voltage connections 7a, 7b to be disconnected from the voltage supply system 1. The two switches 10.2 on the input side of the bridge circuit 8 also enable the two voltage converters 5a, 5b to be partially disconnected from the two battery strings 2a, 2b in the event of a fault. The switches 10.2 can also be controlled by the control/regulation device 25.

A third switch 10.3 is arranged between the first voltage converter 5a and the first battery string 2a. A third switch 10.3 is also arranged between the second voltage converter 5b and the first battery string 2b. The two third switches 10.3 can be integrated into the first or second voltage converters 5a, 5b on the input side. The switches 10.3 can also be controlled by the control/regulation device 25. A fourth switch 10.4 is provided between the first voltage converter 5a and the low-voltage connections 4. Similarly, a fourth switch 10.4 is provided between the second voltage converter 5b and the low-voltage connections 4. The third and fourth switches 10.3, 10.4 serve to electrically isolate the respective first or second voltage converters 5a, 5b from the voltage supply system 1.

The fourth switches 10.4 are moved to the open state if the relevant voltage converter 5a, 5b has a defect, in particular if the voltage converter 5a, 5b generates an electrical short circuit to earth due to a defect. So that this has no influence on the potential distributor 14, the voltage converter is then disconnected from the potential distributor 14 on the output side. The low-voltage connections 4 are then supplied with the low voltage $U_{NS}$ from the remaining voltage converter 5b, 5a.

The third switches 10.3 disconnect the relevant voltage converter 5a, 5b from the battery strings 2a, 2b in two fault scenarios, firstly in the event of a short circuit to earth in the faulty voltage converter 5a, 5b and secondly in the event of an imminent breakdown of the medium voltage $U_{MS}$ to the potential distributor 14 due to a faulty voltage converter 5a, 5b. The third and fourth switches 10.3, 10.4 can also be controlled by the control/regulation device 25.

A fifth switch 10.5 can be provided at each of the low-voltage connections, which can act as a fuse. The switches 10.5 can also be controlled by the control/regulation device 25.

A sixth switch 10.6 is respectively provided at each of the first battery output 12a and the second battery output 12b. In the event of a fault, the two switches 10.6 enable the first or second battery strings 2a, 2b to be disconnected from the voltage supply system 1.

The voltage supply system 1 can be switched between a nominal system state, a first battery string fault state and a second battery string fault state by means of the switches 10.1 to 10.6 presented above.

In the nominal system state, the two battery strings 2a, 2b function in a fault-free manner, i.e., nominally, and both generate the electrical medium voltage $U_{MS}$. Likewise, in the nominal state, the voltage converter unit 5 generates the low voltage $U_{NS}$ from the medium voltage $U_{MS}$.

In the nominal system state of the voltage supply system 1, the bridge circuit 8 is set in such a way that the first medium-voltage connection 7a is electrically connected to the first battery string 2a—but not to the second battery string 2b—and the second medium-voltage connection 7b is electrically connected to the second battery string 2b—but not to the first battery string 2a. In the nominal system state, the low voltage connections 4 are connected to the first battery string 2a or to the second battery string 2b or to both battery strings 2a, 2b. In the nominal system state, all switches 10.1 to 10.6 are in the closed state.

In the first battery string fault state—i.e., when a fault occurs in the first battery string 2a—the bridge circuit 8 is set accordingly such that the first and second voltage connections are both connected to the second battery string 2b, but not to the first battery string 2a. This state is activated when a fault occurs in the first battery string 2a—in particular when this cannot provide the nominal medium voltage $U_{MS}$ due to the fault. In the first battery string fault state, the second battery string 2b additionally assumes the function of the first battery string 2a, which means that it also provides the medium voltage $U_{MS}$ at the first medium voltage connection 7a. Therefore, in the first battery string fault condition, the voltage converter unit 5 is set in such a way that the low-voltage connections 4 are connected to the second battery string 2b—but not to the first battery string 2a.

In the first battery string fault state, the first two switches 10.1, 10.3, 10.4 and 10.5 are in the closed state. The switch 10.2 assigned to the second medium voltage path 6b is in the closed state, the switch 10.2 assigned to the first medium voltage path 6a is in the open state. The switch 10.6 assigned to the second battery string 2b is in the closed state. The switch 10.6 associated with the first battery string 2a is in the open state. In this way, the low voltage $U_{NS}$ is provided at all low-voltage connections 4 and the medium voltage $U_{MS}$ is provided at both medium voltage connections 7a, 7b from the second battery string 2b, whereas the faulty second battery string 2b is electrically isolated from the voltage supply system 1.

In the second battery string fault state—i.e., when a fault occurs in the second battery string 2b—the bridge circuit 8 is set in such a way that the first and second medium voltage connections are both connected to the first battery string 2a, but not to the second battery string 2b. This state is activated when a fault occurs in the second battery string 2b—in particular when this cannot provide the nominal medium voltage $U_{MS}$ due to the fault. In the second battery string fault state, the first battery string 2a additionally assumes the function of the second battery string 2b, which means that it also provides the medium voltage $U_{MS}$ at the second medium voltage connection 7b. Therefore, in the second battery string fault state, the voltage converter unit 5 is set in such a way that the low-voltage connections 4 are connected to the first battery string 2a—but not to the second battery string 2b.

In the second battery string fault state, the first two switches 10.1, 10.3, 10.4 and 10.5 are in the closed state. The switch 10.2 assigned to the first medium voltage path 6a is in the closed state, the switch 10.2 assigned to the second medium voltage path 6b is in the open state. The switch 10.6 associated with the first battery string 2a is in the closed state, the switch 10.6 associated with the second battery string 2b is in the open state. In this way, the low-voltage $U_{NS}$ is provided at all low-voltage terminals 4 and the medium voltage $U_{MS}$ is provided at both medium-voltage connections 7a, 7b from the first battery string 2a, whereas the faulty second battery string 2b is electrically isolated from the voltage supply system 1.

Furthermore, the voltage supply system 1 can—independently of the battery string fault states explained above—additionally have a first and second voltage converter fault state. These two fault states can be combined with the first and second battery string fault states.

If the voltage supply system 1 is in the first voltage converter fault state, there is a fault in the first voltage converter 5a such that it cannot generate the low voltage $U_{NS}$. In this case, the voltage transformation from the medium voltage $U_{MS}$ to the low voltage $U_{NS}$ is carried out exclusively by the second voltage converter 5b. For this purpose, the control/regulation device 25 switches the switches 10.3 and 10.4 associated with the first voltage converter 5a to the open state and the switches 10.3 and 10.4 associated with the second voltage converter 5b to the closed state, starting from the nominal system state. In this way, the first voltage converter 5a that has the malfunction is bypassed.

If the voltage supply system 1 is in the second voltage converter fault state, there is a fault in the second voltage converter 5b so that it cannot generate the low voltage $U_{NS}$. In this case, the voltage transformation from the medium voltage $U_{MS}$ to the low voltage $U_{NS}$ takes place exclusively via the first voltage converter 5a. For this purpose, the control/regulation device 25 switches the switches 10.3 and 10.4 associated with the second voltage converter 5b to the open state and the switches 10.3 and 10.4 associated with the first voltage converter 5a to the closed state, starting from the nominal system state. In this way, the second voltage converter 5b that has the malfunction is bypassed.

Since the two voltage converters 5a, 5b are both connected in parallel with the potential distributor 14, there is double redundancy for the low-voltage connections 4 with regard to the voltage supply, namely against the failure of a battery string 2a or 2b, as well as against the failure of a voltage converter 5a or 5b. The low-voltage connections 4 are thus protected against the failure of a battery string 2a or 2b-regardless of which one—and separately or additionally simultaneously, the failure of a voltage converter 5a, 5b—regardless of which one. As long as at least one battery string 2a, 2b and at least one voltage converter remain in function, the supply of the low-voltage connections, among others, the safety-critical on-board power system control units are supplied with voltage.

The independence of the battery string fault states from the voltage converter fault states described above—and vice-versa—implements a double redundancy in the voltage supply system 1, such that the full functionality of the voltage supply system 1 is guaranteed even in the event of simultaneous failure of one of the two voltage converters 5a, 5b and one of the two battery strings 2a, 2b.

FIG. 2 shows a schematic depiction of an example of a battery module 30 according to the invention. This comprises a voltage supply system 1 according to the invention to each of whose low-voltage connections 4 an electrical consumer 31 is connected, such that it is supplied with a supply voltage of 12V by the voltage supply system 1. By way of example, a fan for cooling the internal combustion engine of the motor vehicle, a braking device for braking the motor vehicle, a vehicle steering device for steering the motor vehicle, and a lighting device for illuminating the interior of the motor vehicle can be considered as an electrical consumer 31.

An electrical consumer 32 is also connected to each of the two medium-voltage connections 7a, 7b in such a way that it is supplied with a supply voltage of 48V by the voltage supply system 1. In the example of the figures, the consumers 32 are a PTC heater for heating a vehicle interior of the motor vehicle, a refrigerant compressor of an air conditioning system present in the motor vehicle, and a starter generator for starting an internal combustion engine of the motor vehicle.

The battery module 30 can optionally have a third medium-voltage connection 7c—not depicted in the exemplary voltage supply system 1 of FIG. 1—to which a DC-DC converter 33 is connected, which raises the medium voltage $U_{MS}$ of 48V provided at the medium-voltage connection 7c to a DC high voltage of between 600V and 700V and provides it on the output side at converter output 34. The high voltage generated by means of the DC-DC converter 33 can be used to drive a motor vehicle with a purely electric drive.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A system comprising:
a first battery string, which outputs an electrical medium voltage at a first battery output;
a second battery string, which outputs the medium voltage at a second battery output;
a potential distributor having a plurality of electrical low-voltage connections, each of which is connectable to the first and second battery strings via a voltage converter unit, wherein the voltage converter unit is configured to reduce the medium voltage provided by the first and second battery strings to a low voltage;
a first and second medium-voltage connection, at which the medium voltage generated by the first or second battery string is provided; and
a bridge circuit configured to connect the first medium voltage connection and the second medium-voltage connection to the first or second battery string; and
a control/regulation device,
wherein the voltage converter unit is disconnected from the first or second battery string by the bridge circuit and by a first or second battery switch, wherein the first and second battery switches are coupled between the voltage converter unit and the first and second battery strings, respectively,
wherein the voltage converter unit comprises
a first voltage converter configured to connect the plurality of low-voltage connections, via the bridge circuit, to the first or second battery string; and a second voltage converter configured to connect the plurality of low-voltage connections, via the bridge circuit, to the first or second battery string,
wherein the bridge circuit includes a first switch electrically coupling the first battery string the first voltage converter and the first medium-voltage connection, and a second switch electrically coupling the second battery string to the second voltage converter and the second medium-voltage connection,
wherein each of the first and second voltage converters include a choke, a third switch between the choke and the first or second battery strings, and a fourth switch between the choke and the potential distributor,
wherein the control/regulation device is coupled to the first, second, third, and fourth switches,
wherein, if there is a simultaneous failure of one of the first and second battery strings and one of the first and second voltage converters, the control/regulation device is configured to open the third and fourth switches of the one of the first and second voltage converters and to open the first or second switch so that the medium voltage generated by a remaining one of the first and second battery strings is reduced to the low voltage by the bridge circuit by a remaining one of the first and second voltage converters and is provided to the plurality of low-voltage connections.

2. The system of claim 1, wherein the bridge circuit has a bridging path connecting first and second medium-voltage paths between the first and second battery strings and the medium-voltage connections.

3. A system comprising:
a first battery string, which outputs an electrical medium voltage at a first battery output;
a second battery string, which outputs the medium voltage at a second battery output;
a potential distributor having a plurality of electrical low-voltage connections, each of which is connectable to the first and second battery strings via a voltage converter unit, wherein the voltage converter unit is configured to reduce the medium voltage provided by the first and second battery strings to a low voltage;
a first and second medium-voltage connection, at which the medium voltage generated by the first or second battery string is provided;
a bridge circuit configured to connect the first medium voltage connection and the second medium-voltage connection to the first or second battery string; and
a control/regulation device,
wherein the voltage converter unit is disconnected from the first or second battery string by the bridge circuit and by a first or second battery switch, wherein the first and second battery switches are coupled between the voltage converter unit and the first and second battery strings, respectively,
wherein the voltage converter unit comprises
a first voltage converter configured to connect the plurality of low-voltage connections, via the bridge circuit, to the first or second battery string; and
a second voltage converter configured to connect the plurality of low-voltage connections, via the bridge circuit, to the first or second battery string,
wherein the bridge circuit includes a first switch electrically coupling the first battery string to the first voltage converter and to the first medium-voltage connection, and a second switch electrically coupling the second battery string to the second voltage converter and to the second medium-voltage connection,
wherein each of the first and second voltage converters transformers-include a choke, a third switch between the choke and the first or second battery strings, and a fourth switch between the choke and the potential distributor,
wherein the control/regulation device is coupled to the first, second, third, and fourth switches,
wherein the system has a nominal system state, a first battery string fault state, and a second battery string fault state, and the system is adjustable or switchable, by the control/regulation device at least between the nominal system state, the first battery string fault state, and the second battery string fault state,
wherein in the nominal system state, the control/regulation device closes the third and fourth switches so that the first medium voltage connection is connected to the first battery string and the second medium voltage connection is connected to the second battery string,
wherein in the first battery string fault condition, the control/regulation device opens the first switch and a fifth switch so that the first and second medium voltage connections are connected to the second battery string, the fifth switch coupling the first battery string to the first voltage converter and to first switch of the bridge circuit, and
wherein in the second battery string fault state, the control/regulation device opens the second switch and a sixth switch so that the first and second medium voltage connections are connected to the first battery string, the sixth switch coupling the second battery string to the second voltage converter and to the second switch of the bridge circuit.

4. The system of claim 3, wherein
in the first battery string fault state, the control/regulation device the first voltage converter connects the plurality of low-voltage connections to the second battery string, and
in the second battery string fault state, the second voltage converter unit connects the plurality of low-voltage connections to the first battery string.

5. The system of claim 3, further comprising:
a seventh switch arranged between the bridging path of the bridge circuit and the first medium-voltage connection in a first medium-voltage path;
an eighth switch arranged in each case between the bridging path of the bridge circuit and the second medium-voltage connection in a second medium-voltage path.

6. The system of claim 5, further comprising:
an additional switch arranged at each of the low-voltage connections of the potential distributor.

* * * * *